United States Patent [19]

Primas et al.

[11] Patent Number: 5,031,234
[45] Date of Patent: Jul. 9, 1991

[54] FIBER OPTIC FREQUENCY TRANSFER LINK

[75] Inventors: Lori E. Primas, La Canada; Richard L. Sydnor, Altadena; George F. Lutes, Glendale, all of Calif.

[73] Assignee: The United States of America as represented by the Administrator of the National Aeronautics and Space Administration, Washington, D.C.

[21] Appl. No.: 359,801

[22] Filed: May 31, 1989

[51] Int. Cl.$^5$ .............................................. H04B 10/00
[52] U.S. Cl. ........................................ 455/605; 356/5
[58] Field of Search ................... 356/5; 455/600, 605, 455/612

[56] References Cited

U.S. PATENT DOCUMENTS

| | | | |
|---|---|---|---|
| 3,571,597 | 3/1971 | Wood et al. | 250/199 |
| 3,863,064 | 1/1975 | Doyle et al. | 250/199 |
| 4,287,606 | 9/1981 | Lutes, Jr. et al. | 455/617 |
| 4,560,270 | 12/1985 | Wiklund et al. | 356/5 |

FOREIGN PATENT DOCUMENTS 58-48253  10/1984  Japan ................................. 455/605

Primary Examiner—Reinhard J. Eisenzopf
Assistant Examiner—Leslie Van Beek
Attorney, Agent, or Firm—Thomas H. Jones; Harold W. Adams; John R. Manning

[57] ABSTRACT

A reference frequency distribution system for transmitting a reference frequency from a reference unit to a remote unit while keeping the reference frequency at the reference unit and remote unit in phase. A fiber optic cable connects the reference unit to the remote unit. A frequency source at the reference unit produces a reference frequency having an adjustable phase. A fiber optic transmitter at the reference unit modulates a light beam with the reference frequency and transmits the light beam into the fiber optic cable. A 50/50 reflector at the remote unit reflects a first portion of the light beam from the reference unit back into the fiber optic cable to the reference unit. A first fiber optic receiver disposed at the remote unit receives a second portion of the light beam and demodulates the reference frequency therefrom to be used at the remote unit. A second fiber optic receiver disposed at the reference unit receives the first portion of the light beam and demodulates a reference frequency component therefrom. A phase conjugator is connected to the frequency source for comparing the phase of the reference frequency component to the phase of the reference frequency modulating the light beam being transmitted from the reference unit and for continuously adjusting the phase of the reference frequency modulating the light beam being transmitted from the reference unit to maintain a conjugate (anti-symmetric) relationship between the reference frequency component and the reference frequency modulating the light beam whereby virtually no phase difference exists between the phase of the reference frequency component and the phase of the reference frequency modulating the light beam.

8 Claims, 8 Drawing Sheets

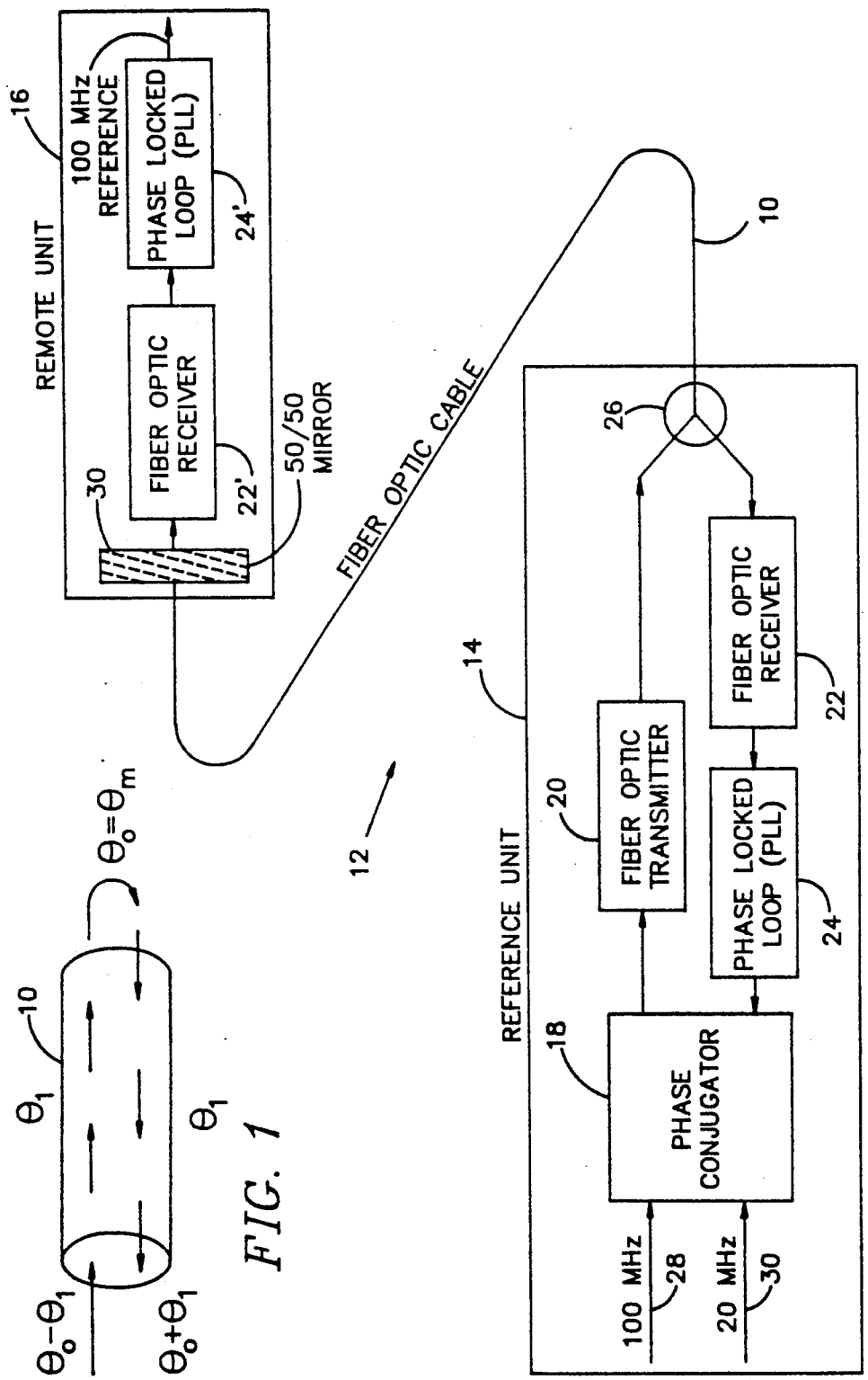

FIBER OPTIC FREQUENCY TRANSFER LINK

ORIGIN ON THE INVENTION

The invention described herein was made in the performance of work under a NASA contract, and is subject to the provisions of Public Law 96-517(35USC 202) in which the Contractor has elected not to retain title.

TECHNICAL FIELD

The invention relates to methods and apparatus for transferring a reference frequency over long distances with extreme accuracy and stability and, more particularly, to a reference frequency distribution system for transmitting a reference frequency from a reference unit to a remote unit while keeping the reference frequency at the reference unit and remote unit in phase comprising, a fiber optic cable connecting the reference unit to the remote unit; source means at the reference unit for producing a reference frequency having an adjustable phase; fiber optic transmitter means at the reference unit for modulating a light beam with the reference frequency and for transmitting the light beam into the fiber optic cable; reflector means at the remote unit for reflecting a first portion of the light beam from the reference unit back into the fiber optic cable to the reference unit; first fiber optic receiver means disposed at the remote unit for receiving a second portion of the light beam and for demodulating the reference frequency therefrom to be used at the remote unit; second fiber optic receiver means disposed at the reference unit for receiving the first portion of the light beam and for demodulating a reference frequency component therefrom; and, phase conjugator means connected to the source means for comparing the phase of the reference frequency component to the phase of the reference frequency modulating the light beam being transmitted from the reference unit and for continuously adjusting the phase of the reference frequency modulating the light beam being transmitted from the reference unit to maintain a conjugate (antisymmetric) relationship between the reference frequency component and the reference frequency modulating the light beam whereby virtually no phase difference exists between the phase of the reference frequency component and the phase of the reference frequency modulating the light beam.

More particularly, it relates to a reference frequency distribution system wherein the phase conjugator means comprises, a source of an auxiliary reference frequency different from the frequency of the reference frequency; first mixer means for mixing the reference frequency and the auxiliary reference frequency to produce a sum frequency component and a difference frequency component; voltage controlled oscillator means for producing the reference frequency at an output thereof and having a phase which is related to a voltage at a control input thereof; signal splitter means for receiving the reference frequency from the output of the voltage controlled oscillator means and for splitting it into two output portions, one of the output portions being used as the reference frequency modulating the light beam being transmitted from the reference unit; second mixer means for mixing the reference frequency component with the sum component to produce a first comparison frequency component at a comparison frequency; third mixer means for mixing the other of the two output portions from the output of the signal splitter means with the difference component to produce a second comparison frequency component at the comparison frequency; and, phase comparison means for comparing the phase of the first comparison frequency component to the phase of the second comparison frequency component and for outputting a voltage to the control input of the voltage controlled oscillator means which is a function of the phase difference of the first and second comparison frequency components.

BACKGROUND ART

In the field of frequency distribution systems, frequency standards, such as hydrogen masers, generate stable reference frequencies in support of precision measurements as, for example, those made in the NASA/JPL Deep Space Network (DSN). DSN applications of frequency standards include support of unmanned space projects, flight radio science, radio and radar astronomy, very long baseline interferometry, geodynamic measurements, and gravitational wave detection. The distribution of reference frequencies to multiple remote users in the DSN is accomplished through a frequency distribution system that must operate over distances as great as 30 km from the standard. The stability of the distribution system must be at least an order of magnitude higher than the stability of the reference frequency so as to ensure minimal degradation of the distributed reference. More specifically, the distribution system itself must have minimal impact on the stability of the transmitted reference frequency.

The stability of present frequency standards has an Allan variance on the order of $8 \times 10^{-16}$ for 1000 seconds averaging time. Researchers expect future frequency standards to be improved by an order of magnitude over this value. The stability of the distribution system then must be at least ten times higher than the stability of the reference frequency in order to ensure minimal degradation of the distributed reference.

The degradation of the distributed reference frequency is due primarily to variations in the group delay in the transmission medium. For example, optic fibers are a popular transmission medium for all types of applications, including the transmission of a reference frequency. In an optic fiber distribution system, degradation of the distributed reference frequency can be caused by changes in the length of the optic fibers due to temperature variations and the like.

In the particular application of the DSN, a desirable performance baseline for such a distribution system would be the ability to transmit a 100 MHz reference signal over a distance of 22 km with a stability of one part in $10^{17}$ for 1,000 seconds averaging time.

STATEMENT OF THE INVENTION

Accordingly, it is an object of this invention to provide a stabilized fiber optic reference frequency distribution system designed to transmit a 100 MHz reference signal generated by a hydrogen maser frequency standard over a distance of 22 km with a goal of maintaining a stability of one part in $10^{17}$ for 1,000 seconds averaging time.

It is another object of this invention to provide an electronic control system for use with a fiber optic reference frequency distribution system which will reduce group delay variations in the fiber optic cable.

Other objects and benefits of this invention will become apparent from the detailed description which follows hereinafter when taken in conjunction with the drawing figures which accompany it.

BRIEF DESCRIPTION OF THE DRAWINGS

FIG. 1 is a simplified drawing depicting the conjugation method employed in the invention.

FIG. 2 is a simplified functional block diagram of a distribution system according to the invention.

DETAILED DESCRIPTION OF THE INVENTION

Figure 3:
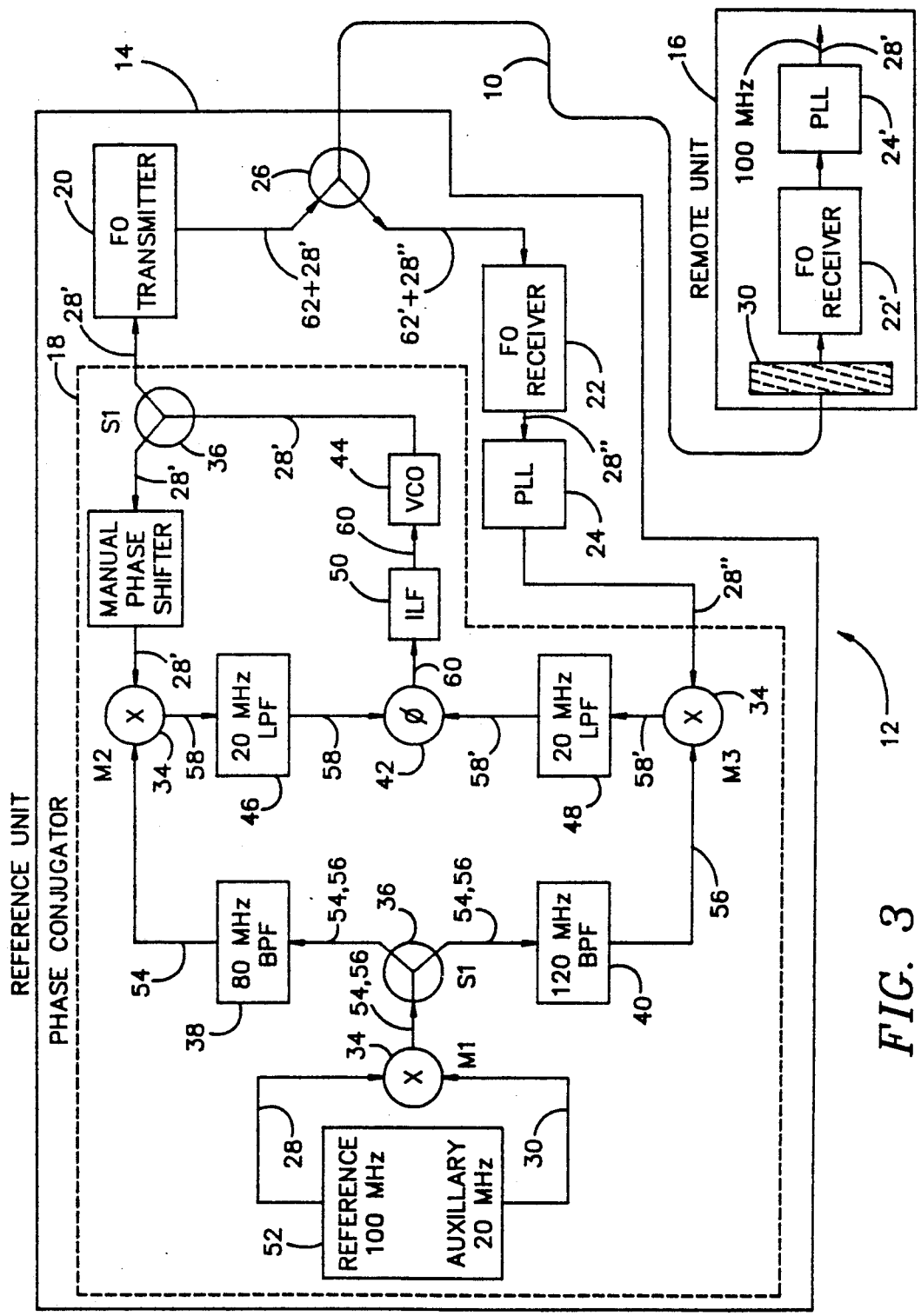
FIG. 3 is a more detailed functional block diagram of a distribution system according to the invention and, in particular, the phase conjugator portion thereof.

A stabilized fiber optic reference frequency distribution system as will be described hereinafter has been fabricated and tested by the inventors herein at NASA's Jet Propulsion Laboratory (JPL) in Pasadena, Calif. The distribution system is designed to transmit a 100 MHz reference signal generated by a hydrogen maser frequency standard over a distance of 22 km with the goal of maintaining a stability of one part in $10^{17}$ for 1,000 seconds averaging time. The stabilizing circuitry reduces delay variations that result from environmental changes on the fiber such as temperature. The stabilizer does the phase correction from one end of the link and maintains a constant phase relationship at the far end of the link. This is an important distinction. Stabilizing circuits for optic fiber links are known in the art but operate at both ends of the link. In this regard, see for example U.S. Pat. No. 4,287,606 of Lutes, Jr. et al. That apparatus is similar to that of this invention in that is uses fiber optic transmission to provide a phase stabilized signal at the receiving end. There are two main differences in the design and operation, however. In the Lutes, Jr. et al. apparatus, the phase correction is done by passing the signal both ways through a voltage controlled phase shifter whereas this invention employs a voltage controlled oscillator to add the phase correction. More importantly, in the Lutes, Jr. et al. apparatus the signal is re-transmitted at the far end whereas in this invention the signal is merely reflected back to the transmitting end and all correction is made at the transmitting end.

The system of this invention was first tested employing a computer simulation program which allowed the delays, bandwidths, gains, and damping factors to be varied and exhaustively tested for optimum performance before construction of actual hardware. A breadboard version was then fabricated and tested in an environmentally controlled test chamber. In preliminary tests, the stabilizer reduced phase variations caused by temperature changes of 20° C. by as much as forty-five times.

This invention is founded on the fact that a constant rate of change in group delay, D, adds a constant frequency offset, $\Delta f$; but, does not degrade the frequency stability. If the rate of change of group delay is not constant, the frequency stability is degraded by, $$\frac{d(\Delta f)}{dt} = f \frac{d^2 D}{dt^2}$$

where f is the transmitted frequency. Temperature change is the primary cause of group delay variations in a fiber optic cable. For a step change in temperature, $\Delta T$, the change in the frequency offset $\Delta f$ is related to the temperature coefficient of delay, $\alpha$, and time constant of the fiber, $\tau$, by, $$\frac{d(\Delta f)}{dt} = \frac{-\alpha \Delta T e^{\frac{t}{\tau}}}{\tau^2}$$

From this latter equation we see that the rate of change of frequency offset is decreased by decreasing the temperature change or by increasing the time constant of the cable.

Because of the small temperature coefficient of delay and the low loss of optical fibers, they are the most practical medium for transmitting reference frequencies over distances longer than a few meters. Optical cables used in the DSN are buried underground to decrease the temperature changes on the cable and to increase the time constant of the cable. This is usually sufficient for very short distances; however, it is insufficient for longer distances.

The stabilized fiber optic distribution system of this invention which is now to be described uses a phase conjugation method of stabilization. This method was chosen because it does not require a variable delay device in the two say signal path, as the prior art approaches to the problem do. Such a variable delay device must have a range of delays equal to the group delay variation to be reduced and must have exactly the same phase delay in both directions at all times. Devices meeting these requirements are most difficult to implement, particularly in optical fiber. Thus, it was a primary goal of the inventors herein to eliminate from their system such devices as employed by the prior art.

The conjugation method as employed in this invention can best be understood with reference to FIG. 1. In this invention, as in most cable stabilization methods, the signal propagates through the optical fiber cable 10 in both directions; therefore, the midpoint of the round trip signal path is at the far end of the cable 10. The system maintains a conjugate (anti-symmetric) relationship to the reference between the forward signal and the reverse signal at the input to the cable 10. The phase modulo $2\pi(\theta_m)$ at the far end of the cable 10 is $$\theta_m = (\theta_0 - \theta_1) + \frac{(\theta_0 + \theta_1) - (\theta_0 - \theta_1)}{2} = \theta_0$$

where, $\theta_0$ is the reference phase modulo $2\pi$ and $\theta_1$ is the delay phase modulo $2\pi$. Thus, with the conjugate relationship satisfied, the phase at the far end of the cable 10 is the same as the reference phase at the transmitting end and the two-way link is stabilized. That, of course, is the whole object of the system. In other words, by satisfying the conjugate relationship of the transmission link on a continuing basis, the system of this invention can keep the near and far ends of the cable 10 in a phase stabilized state without the need for any type of delay devices in the cable.

Referring now to FIG. 2, as depicted therein the stabilized fiber optic distribution system 12 of this invention is electronically controlled and uses the conjugation method as described briefly above to maintain frequency stability. The distribution system 12 consists of a reference unit 14, located at the reference frequency source, and a remote unit 16, located at the site where the reference frequency is received. The reference unit 14 consists of a phase conjugator 18, a fiber optic transmitter 20, a fiber optic receiver 22, a phase lock loop (PLL) 24, and a fiber optic coupler 26. The phase conjugator 18 compares the phase at the transmitter 20 and receiver 22 of the reference unit 14 and uses a voltage controlled oscillator (VCO), to be described shortly, to maintain a constant phase at the remote unit 16. The conjugator 18 requires a 100 MHz reference signal 28 and a 20 MHz auxiliary signal 30. It should be noted here that an early implementation of the phase conjugator 18 used only a single 100 MHz reference signal; but, required two precisely matched phase detectors and tightly controlled signal levels. The preferred implementation as is being described herein employing the two signals 28, 30 is much easier to implement because a single phase detector is used to measure the phase error. As also shown in FIG. 2, the remote unit 16 comprises a 50/50 mirror 32, another fiber optic receiver 22', and another PLL 24'.

Turning now to FIG. 3, a block diagram of the stabilized fiber optic distribution system 12 of this invention is shown in greater detail. As can be seen therein, the phase conjugator 18 contains three mixers 34 (designated for convenience as M1, M2, and M3), two RF power splitters 36 (S1 and S2), two band-pass filters 38 and 40, a phase detector 42, a voltage controlled oscillator (VCO) 44, two low-pass filters 46 and 48, and an inner loop filter 50. In the tested breadboard configuration as described herein, a synthesizer 52 supplies both the 100 MHz signal 28 and the 20 MHz signal 30 to the first mixer 34 (M1), which multiplies the two signals 28, 30 together to produce 80 MHz and 120 MHz signals 54 and 56, respectively. Power splitter 36 (S1) separates the signals 54, 56 out of mixer 34 (M1) into two signal paths. The filters 38, 40 in each of the signal paths pass only one frequency; thus, the 120 MHz signal 56 is the output from one band-pass filter 40 while the 80 MHz signal 54 is the output of the other band-pass filter 38.

The second mixer 34 (M2) is used to multiply the 80 MHz signal 54 and a 100 MHz signal 28' from the VCO 44 to produce a 20 MHz intermediate frequency (IF) signal 58. Thus, the 20 MHz IF signal 58 contains the instantaneous phase difference between the VCO signal 28' and the 80 MHz reference signal 54. Similarly, the third mixer 34 (M3) is used to multiply the 120 MHz signal 56 and a 100 MHz signal 28" coming from the remote unit 16 to produce another 20 MHz IF signal 58'. This 20 MHz IF signal 58' contains the instantaneous phase difference between the return reference signal (i.e. a return portion of the transmitted signal being the signal 28") and the 120 MHz reference signal 56. Thus, it can be seen that the reference unit 14 ends up producing two 20 MHz signals 58, 58' (i.e. signals at the same frequency which can be readily compared) each containing phase information necessary to the detection and adjustment process which must take place to maintain stability.

The phase detector 42 receives the two 20 MHz IF signals 58, 58' and produces a voltage at 60 that is proportional to the phase difference between them. The voltage 60 is applied to the error input of the VCO 44 through an inner loop filter 50. Delay changes in the fiber optic cable 10 result in corresponding directly related changes in the control voltage 60. The voltage 60 thus controls the phase of the VCO 44 relative to the original 100 MHz reference signal 28. The RF power splitter 36 (S2) divides the output 28' of the VCO 44 into two signals. Mixer 34 (M2) receives one of the signals 28' while the other signal 28' modulates the optical carrier 62 emitted from the laser transmitter 20. Note that the "manual phase shifter" is shown only because it was part of the tested breadboard unit. The modulated optical signal 62+28' then passes through a two-way optical coupler 26 into the fiber optic cable 10. The 50/50 mirror 32 at the remote unit 16 reflects half of the optical signal 62+28' back into and through the cable 10 toward the reference unit 14. The other half of the optical signal 62+28' passes through the mirror 32 to the optical receiver 22'. The receiver 22' demodulates the optical signal (62+28'−62=28') and amplifies the resulting 100 MHz RF signal 28'. The PLL 24' filters the signal 28' which is then used as a remote reference frequency for whatever uses are required of it in the particular application. The reflected portion of the optical signal 62'+28" returns to the reference unit 14 where it passes through the optical coupler 26 and is detected and demodulated by the optical receiver 22 to produce the return 100 MHz signal 28" referred to earlier which is then filtered by the PLL 24. Mixer 34 (M3) receives the resulting 100 MHz signal 28" as described earlier. With the return portion of the signal back at the reference unit 14, the system loop is closed.

TEST RESULTS

As mentioned earlier, the system of this invention was first evaluated in a computer simulation. The equations describing the various functional components and their interconnections were evaluated using the spreadsheet program sold under the trademark LOTUS 1-2-3. The system stability was examined by determining the frequency response of the closed loop transfer function and the error transfer function as various parameters were varied. The gains of the mixers, phase detectors, and VCO were determined by testing the components; but, the bandwidths, damping factors, and additional gains were varied for optimum system design. Damping factors were varied from 0.7 to 1.4. The bandwidths of the inner loop and the PLLs were determined from the spectral noise characteristics of the reference frequency (a hydrogen maser), the VCO, and the fiber optic link. Different delays could also be examined.

Figure 4:
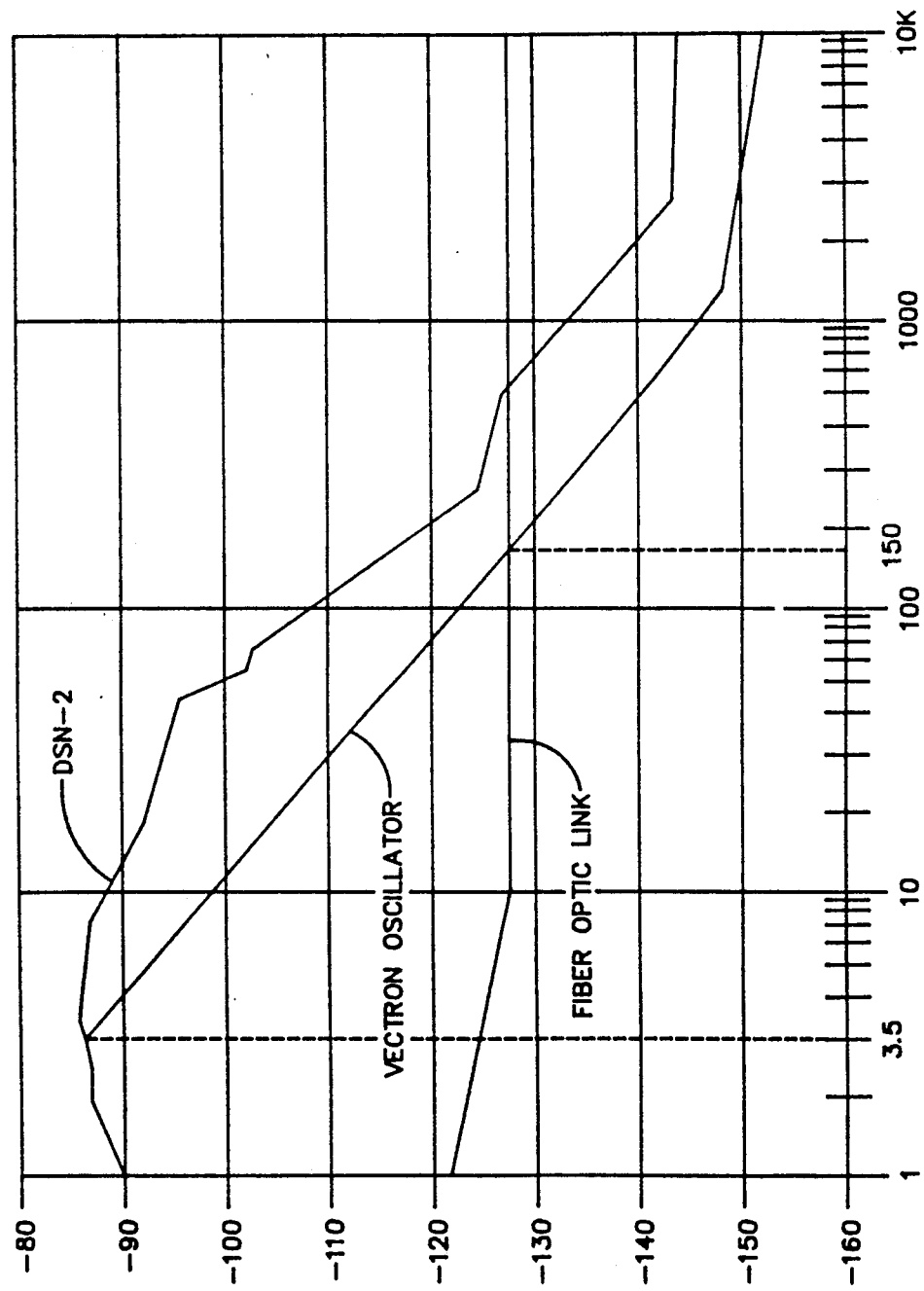
FIG. 4 is a graph depicting plots of spectral noise of a maser, VCO and fiber optic link versus frequency.

It was found that the PLL in the reference unit cleans up the signal and maintains a high signal-to-noise ratio and a constant amplitude into the phase detector. Its bandwidth is determined by the intersection of the spectral noise of the VCO and the fibre optic link (see FIG. 4). This allows the high fiber optic link stability to be attained for low offset frequencies and the low noise of the VCO at high offset frequencies. The 7 dB bandwidth of the PLL is related to the cross-over frequency by $BW = 2B_1 = 3.2 f_c$—where $f_c$ is the cross-over frequency, $B_1$ is the single-sided noise bandwidth, and BW is the double-sided bandwidth. The optimum inner loop bandwidth is dependent on the noise spectrum of the reference frequency to be transmitted. Two conditions determine the bandwidth of the inner loop. First, the inner loop bandwidth must be much smaller (e.g. fifty times) than the bandwidth of the PLL in the reference unit for system stability. Second, the inner loop bandwidth must be wider (ten times minimum) than typical variations in the fiber. While there is also a PLL at the remote unit to clean up the signal, the signal out of this PLL is not returned to the reference unit and thus does not affect the system stability. The bandwidth chosen for the PLL in the remote unit is dependent on the spectral noise of the reference source; but, typically, will be approximately the same as the inner loop bandwidth.

Figure 5:
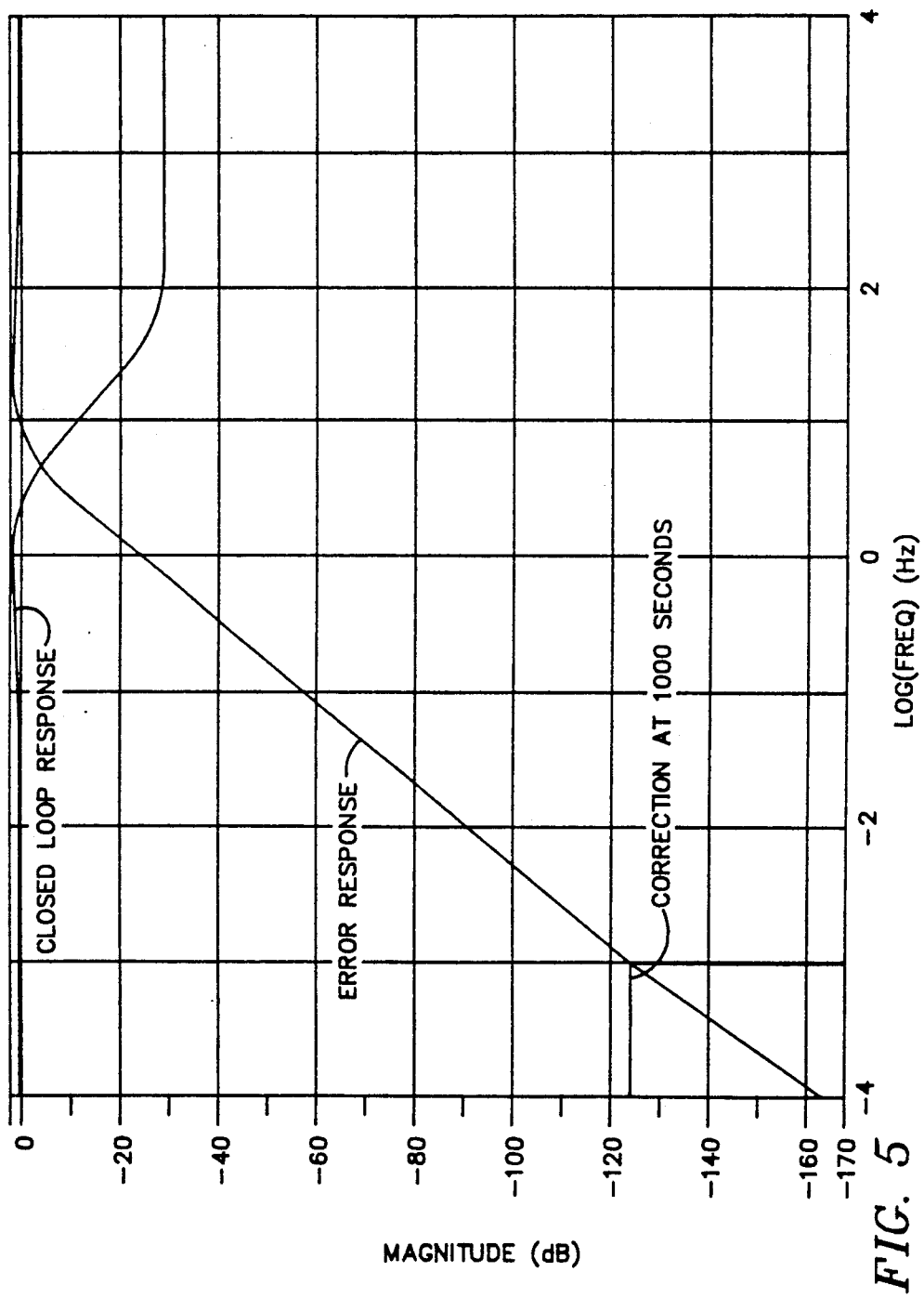
FIG. 5 is a graph depicting plots of closed loop and error responses.

The evaluation of the system was accomplished with an inner loop bandwidth of 11 Hz and a PLL bandwidth of 475 Hz at the reference unit. The closed loop and error responses obtained with these bandwidths are shown in FIG. 5. From this analysis, the inventors determined that it is theoretically possible to reduce phase variations at the remote unit by 124 dB at 1000 seconds averaging time. Such a factor corresponds to a phase reduction of approximately $10^6$ times.

Figure 6:
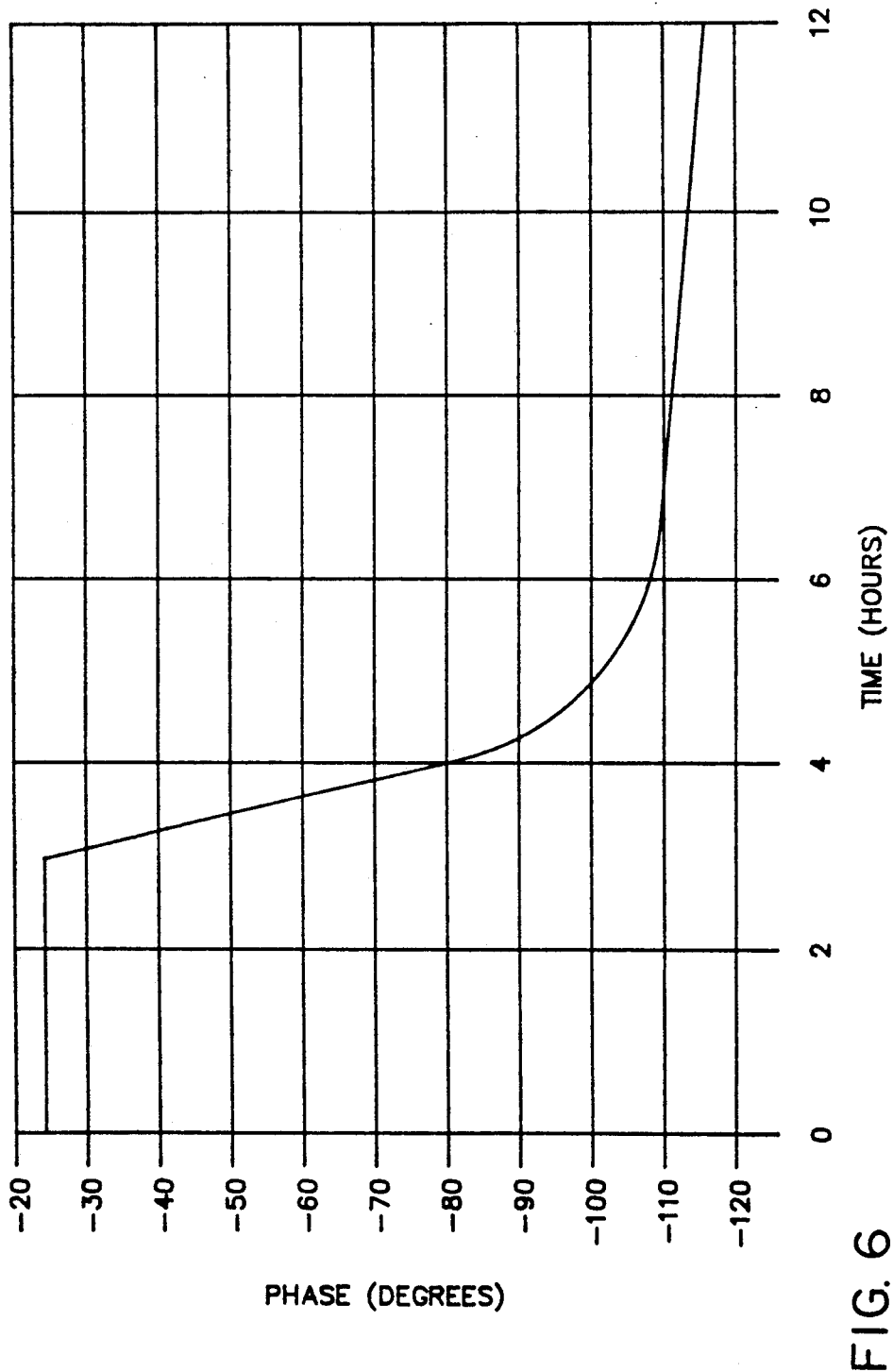
FIG. 6 is a graph depicting a plot of phase shift across a four Km fiber for a 20° C. temperature change.

As also mentioned earlier, after the parameters were optimized employing the simulation of the system, an actual system was constructed and tested under laboratory conditions. Preliminary tests were performed on a 1 km length of fiber optic cable containing four fibers connected in series for a total length of 4 km to determine its temperature coefficient of delay. The cable was wound on a test rack that allowed circulation of air. The test rack was then placed in an environmentally controlled test chamber where temperature, pressure, and humidity could be varied. A 100 MHz signal from hydrogen maser was transmitted through the fiber while the phase between the transmitted end and the receiving end were monitored. The temperature was then stepped from 15° C. to 35° C. while the pressure and humidity were kept constant. In this arrangement, the phase between the transmitted end and the received end of the fiber optic cable changed eighty-nine degrees over nine hours (see FIG. 6). The measured temperature coefficient of delay for the fiber was 6.49 ppm/° C.

Figure 7:
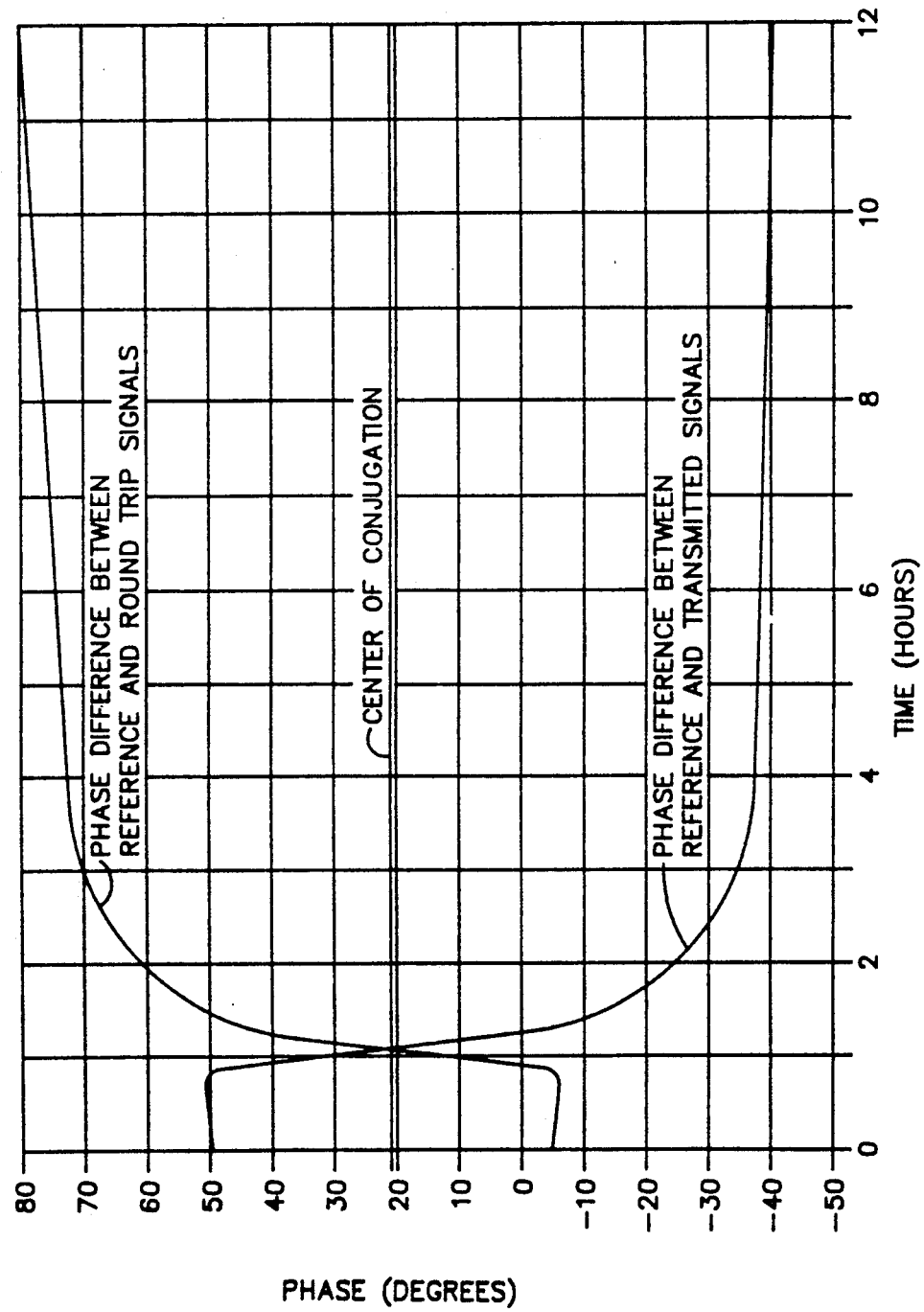
FIG. 7 is a graph depicting plots of phases at mixers M2 and M3 in the reference unit.
Figure 8:
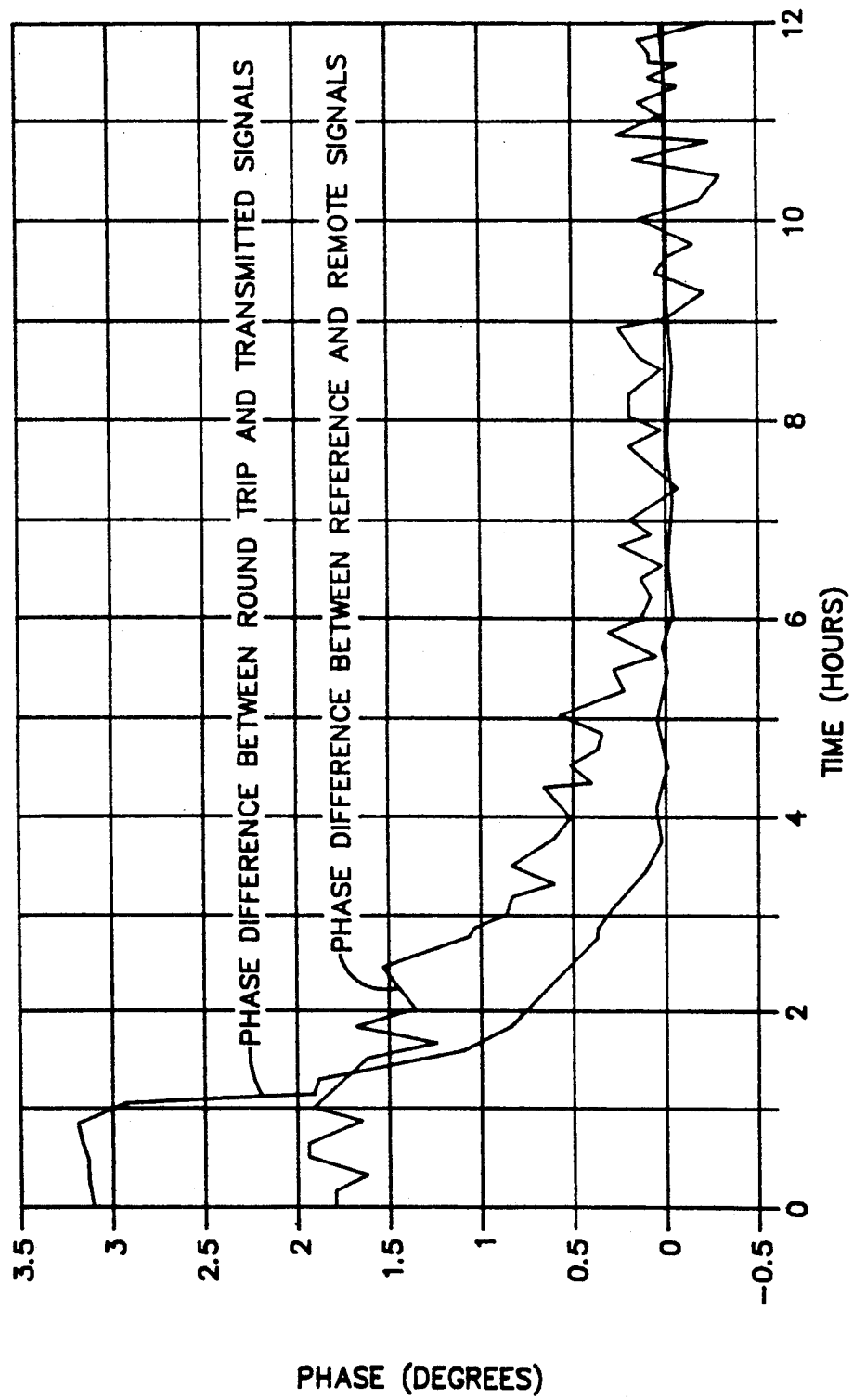
FIG. 8 is a graph depicting plots of phase conjugation and remote unit phase.

A breadboard version of the stabilizing system of the invention was then assembled and tested in the same environment employing the parameters obtained previously. Tests were performed on the stabilizer by varying the temperature of the fiber and monitoring the signal phase across the link. The system was initialized by using manual phase shifters to compensate for phase delays added by the fiber optic transmitter, receivers, PLLs, and other delays in the system. This allowed the system's ability to compensate for dynamic changes to be evaluated without interference and/or misinterpretation due to the presence of system delay constants. FIG. 7 shows the phase difference in the reference unit between the reference and the transmitted signals and the phase difference between the reference and received signals after the round trip signal path. As can be seen from FIG. 7, the transmitted and received signals at the reference unit are conjugate around 22 degrees. The phase difference between the signal at the receiver of the remote unit and the reference unit was also measured. The results of this measurement is shown in FIG. 8. Also shown in FIG. 8 is the conjugation error. Phase variations at the fiber optic transmitter and the receiver in the reference unit were approximately 90 degrees, while the phase at the remote unit varied only 2 degrees for an overall correction of forty-five times. In this regard, it is interesting to note that from a comparison of the data graphed in FIG. 9, the phase variation at the remote unit is probably due to the conjugation error at the start of the test. Also, RF leakage and a poor signal-to-noise ratio in the breadboard system as tested appears to have limited the correction factor achieved to a value smaller than the theoretical limit. Further testing is now being done with improved test modules.

Figure 9:
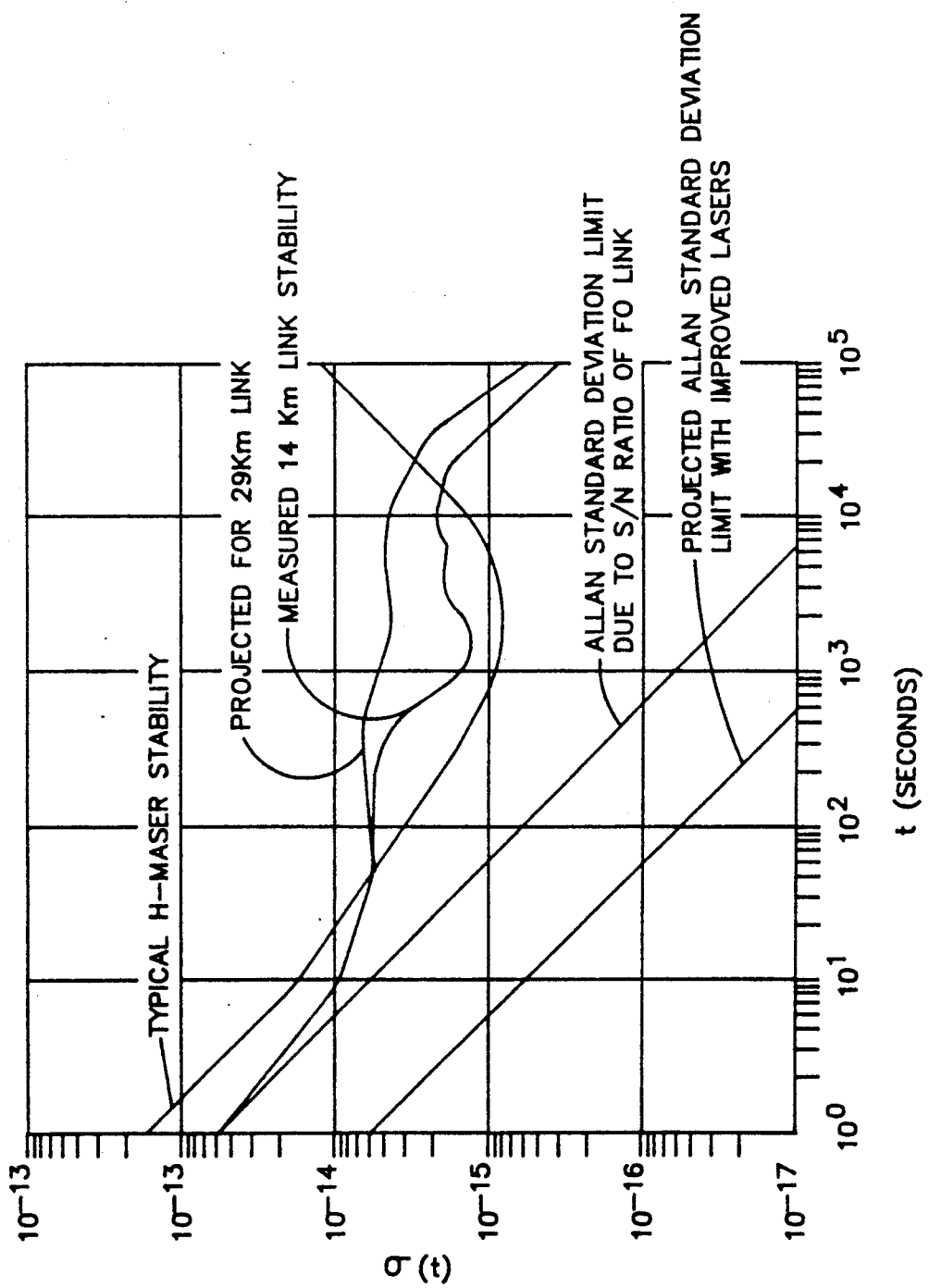
FIG. 9 is a graph depicting plots showing frequency stability correction required.

The amount of correction needed can be determined from a data compilation such as that FIG. 9 which shows stability curves for a typical hydrogen maser, a 14 km fiber optic link, and an estimated plot of a 29 km link needed at the Goldstone Deep Space Communications Complex. Also shown in the figure is the stability limit imposed by the signal-to-noise ratio of the present fiber optic link. The figure shows that a correction of twenty times is sufficient to reduce the link stability to the level imposed by the signal-to-noise ratio or to a level ten times better than the hydrogen maser.

Wherefore, having thus described the present invention, what is claimed is:

1. In a reference frequency distribution system having a reference unit with a reference frequency source connected to a remote unit by a fiber optic cable for conducting a light beam modulated by the reference frequency transmitted from the reference unit to the remote unit, the improvement for keeping the reference frequency at the reference unit and remote unit in phase comprising:
    (a) reflector means at the remote unit for reflecting a portion of the light beam from the reference unit back into the fiber optic cable to the reference unit;
    (b) fiber optic receiver means disposed at an end of the fiber optic cable at the reference unit for receiving said portion of the light beam and for demodulating a reference frequency component modulated thereon; and,
    (c) phase conjugator means for comparing the phase of said reference frequency component to the phase of the reference frequency modulating the light beam being transmitted from the reference unit and for continuously adjusting the phase of the reference frequency modulating the light beam being transmitted from the reference unit to maintain a conjugate (antisymmetric) relationship between said reference frequency component and the reference frequency modulating the light beam being transmitted from the reference unit whereby virtually no phase difference exists between the phase of said reference frequency component and the phase of the reference frequency modulating the light beam being transmitted from the reference unit.

2. The improvement to a reference frequency distribution system of claim 1 wherein said phase conjugator means comprises:
    (a) a source of an auxiliary reference frequency different from the frequency of the reference frequency;
    (b) first mixer means for mixing the reference frequency and said auxiliary reference frequency to produce a sum frequency component and a difference frequency component;
    (c) voltage controlled oscillator means for producing at an output thereof a reference frequency having a phase which is related to a voltage at a control input thereof;
    (d) signal splitter means for receiving said reference frequency from said output of said voltage controlled oscillator means and for splitting it into two output portions, one of said output portions being used as the reference frequency modulating the light beam being transmitted from the reference unit;

(e) second mixer means for mixing said reference frequency component with said sum component to produce a first comparison frequency component at a comparison frequency;

(f) third mixer means for mixing the other of said two output portions from said output of said signal splitter means with said difference component to produce a second comparison frequency component at said comparison frequency; and, (g) phase comparison means for comparing the phase of said first comparison frequency component to the phase of said second comparison frequency component and for outputting a voltage to said control input of said voltage controlled oscillator means which is a function of the phase difference of said first and second comparison frequency components.

3. A reference frequency distribution system for transmitting a reference frequency from a reference unit to a remote unit while keeping the reference frequency at the reference unit and remote unit in phase comprising:

(a) a fiber optic cable connecting the reference unit to the remote unit;

(b) source means at the reference unit for producing a reference frequency having an adjustable phase;

(c) fiber optic transmitter means at the reference unit for modulating a light beam with said reference frequency and for transmitting said light beam into said fiber optic cable;

(d) reflector means at the remote unit for reflecting a first portion of said light beam from the reference unit back into said fiber optic cable to the reference unit;

(e) first fiber optic receiver means disposed at the remote unit for receiving a second portion of said light beam and for demodulating said reference frequency therefrom to be used at the remote unit;

(f) second fiber optic receiver means disposed at the reference unit for receiving said first portion of said light beam and for demodulating a reference frequency component therefrom; and, (g) phase conjugator means connected to said source means for comparing the phase of said reference frequency component to the phase of said reference frequency modulating said light beam being transmitted from the reference unit and for continuously adjusting the phase of said reference frequency modulating said light beam being transmitted from the reference unit to maintain a conjugate (anti-symmetric) relationship between said reference frequency component and said reference frequency modulating said light beam whereby virtually no phase difference exists between the phase of said reference frequency component and the phase of said reference frequency modulating the light beam.

4. The reference frequency distribution system of claim 3 wherein said phase conjugator means comprises:

(a) a source of an auxiliary reference frequency different from the frequency of said reference frequency;

(b) first mixer means for mixing said reference frequency and said auxiliary reference frequency to produce a sum frequency component and a difference frequency component;

(c) voltage controlled oscillator means for producing said reference frequency at an output thereof and having a phase which is related to a voltage at a control input thereof;

(d) signal splitter means for receiving said reference frequency from said output of said voltage controlled oscillator means and for splitting it into two output portions, one of said output portions being used as said reference frequency modulating said light beam being transmitted from the reference unit;

(e) second mixer means for mixing said reference frequency component with said sum component to produce a first comparison frequency component at a comparison frequency;

(f) third mixer means for mixing the other of said two output portions from said output of said signal splitter means with said difference component to produce a second comparison frequency component at said comparison frequency; and, (g) phase comparison means for comparing the phase of said first comparison frequency component to the phase of said second comparison frequency component and for outputting a voltage to said control input of said voltage controlled oscillator means which is a function of the phase difference of said first and second comparison frequency components.

5. In a reference frequency distribution system having a reference unit with a reference frequency source connected to a remote unit by a fiber optic cable for conducting a light beam modulated by the reference frequency transmitted from the reference unit to the remote unit, the method of operation for keeping the reference frequency at the reference unit and remote unit in phase comprising the steps of:

(a) at the remote unit, reflecting a portion of the light beam from the reference unit back into the fiber optic cable to the reference unit; and at the reference unit, (b) receiving the portion of the light beam;

(c) demodulating a reference frequency component therefrom;

(d) comparing the phase of the reference frequency component to the phase of the reference frequency modulating the light beam being transmitted from the reference unit; and, (e) continuously adjusting the phase of the reference frequency modulating the light beam being transmitted from the reference unit to maintain a conjugate (anti-symmetric) relationship between the reference frequency component and the reference frequency modulating the light beam being transmitted from the reference unit whereby virtually no phase difference exists between the phase of the reference frequency component and the phase of the reference frequency modulating the light beam being transmitted from the reference unit.

6. The method of claim 5 wherein the steps thereof include the steps of:

(a) providing an auxiliary reference frequency different from the frequency of the reference frequency;

(b) mixing the reference frequency and the auxiliary reference frequency to produce a sum frequency component and a difference frequency component;

(c) employing a voltage controlled oscillator to produce a reference frequency having a phase which is related to a voltage at a control input thereof;

(d) receiving the reference frequency from the output of the voltage controlled oscillator means and splitting it into two output portions;

(e) employing one of the output portions as the reference frequency modulating the light beam being transmitted from the reference unit;

(f) mixing the reference frequency component with the sum component to produce a first comparison frequency component at a comparison frequency;

(g) mixing the other of the two output portions with the difference component to produce a second comparison frequency component at the comparison frequency;

(h) continuously comparing the phase of the first comparison frequency component to the phase of the second comparison frequency component; and, (i) outputting a voltage to the control input of the voltage controlled oscillator which is a function of the phase difference of the first and second comparison frequency components.

7. A method of connecting and operating a reference frequency distribution system transmitting a reference frequency from a reference unit to a remote unit so as to keep the reference frequency at the reference unit and remote unit in phase comprising the steps of:

(a) connecting a fiber optic cable between the reference unit and the remote unit;

(b) at the reference unit, producing a reference frequency having an adjustable phase, modulating a light beam with the reference frequency, and transmitting the light beam into the fiber optic cable;

(c) at the remote unit, reflecting a first portion of the light beam from the reference unit back into the fiber optic cable to the reference unit, receiving a second portion of the light beam, and demodulating the reference frequency therefrom to be used at the remote unit; and additionally at the reference unit, (d) receiving the first portion of the light beam;

(e) demodulating a reference frequency component therefrom;

(f) comparing the phase of the reference frequency component to the phase of the reference frequency modulating the light beam being transmitted from the reference unit; and, (g) continuously adjusting the phase of the reference frequency modulating the light beam being transmitted from the reference unit to maintain a conjugate (anti-symmetric) relationship between the reference frequency component and the reference frequency modulating the light beam whereby virtually no phase difference exists between the phase of the reference frequency component and the phase of the reference frequency modulating the light beam.

8. The method of claim 7 wherein the steps thereof include the steps of:

(a) providing an auxiliary reference frequency different from the frequency of the reference frequency;

(b) mixing the reference frequency and the auxiliary reference frequency to produce a sum frequency component and a difference frequency component;

(c) using a voltage controlled oscillator having a phase which is related to a voltage at a control input thereof to produce the reference frequency;

(d) receiving the reference frequency from an output of the voltage controlled oscillator and splitting it into two output portions;

(e) using one of the output portions as the reference frequency to modulate the light beam;

(f) mixing the reference frequency component with the sum component to produce a first comparison frequency component at a comparison frequency;

(g) mixing the other of the two output portions with the difference component to produce a second comparison frequency component at the comparison frequency; and, (h) comparing the phase of the first comparison frequency component to the phase of the second comparison frequency component and outputting a voltage to the control input of the voltage controlled oscillator which is a function of the phase difference of the first and second comparison frequency components.

* * * * *